US012749756B2

(12) United States Patent
Saitou et al.

(10) Patent No.: US 12,749,756 B2
(45) Date of Patent: Sep. 29, 2026

(54) BATTERY MODULE AND BATTERY SYSTEM

(71) Applicant: Nissan Motor Co., Ltd., Yokohama (JP)

(72) Inventors: Hiroaki Saitou, Kanagawa (JP); Toyoki Iguchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 561 days.

(21) Appl. No.: 18/287,432

(22) PCT Filed: Apr. 23, 2021

(86) PCT No.: PCT/JP2021/016550
§ 371 (c)(1),
(2) Date: Oct. 18, 2023

(87) PCT Pub. No.: WO2022/224461
PCT Pub. Date: Oct. 27, 2022

(65) Prior Publication Data
US 2024/0204323 A1 Jun. 20, 2024

(51) Int. Cl.
*H01M 50/242* (2021.01)
*H01M 50/209* (2021.01)

(52) U.S. Cl.
CPC ....... *H01M 50/242* (2021.01); *H01M 50/209* (2021.01)

(58) Field of Classification Search
CPC .......................... H01M 50/242; H01M 50/209
See application file for complete search history.

(56) References Cited

U.S. PATENT DOCUMENTS

| | | | |
|---|---|---|---|
| 2018/0047954 | A1 | 2/2018 | Yoo et al. |
| 2019/0198830 | A1 | 6/2019 | Kawakami et al. |
| 2021/0305651 | A1 | 9/2021 | You et al. |

FOREIGN PATENT DOCUMENTS

| | | | | | |
|---|---|---|---|---|---|
| CN | 107408650 | A | | 11/2017 | |
| CN | 210723128 | U | * | 6/2020 | .......... H01M 50/211 |
| EP | 3301738 | A1 | | 4/2018 | |
| JP | 2004-104923 | A | | 4/2004 | |
| JP | 2014-179298 | A | | 9/2014 | |
| JP | 2019-114477 | A | | 7/2019 | |
| KR | 10-2018-0068379 | A | | 6/2018 | |
| KR | 10-2020-0033666 | A | | 3/2020 | |
| WO | 2014167019 | A1 | | 10/2014 | |
| WO | 2019031075 | A1 | | 2/2019 | |

* cited by examiner

*Primary Examiner* — Stephan J Essex
(74) *Attorney, Agent, or Firm* — Young Basile Hanlon & MacFarlane. P.C.

(57) ABSTRACT

A battery module has a plate-like battery and a case in which the battery is contained. The case includes plane portions sandwiching planar portions of the battery, and a side-surface portion opposing a side surface of the battery and connected with the plane portions with a first side therebetween. The side surface portion of the case has a curving-regulating structure extending from a second side opposite the first side toward the first side.

8 Claims, 11 Drawing Sheets

BATTERY MODULE AND BATTERY SYSTEM

TECHNICAL FIELD

The present invention relates to a battery module and a battery system.

BACKGROUND ART

In an electric vehicle or the like, an electric power source is constituted by using a plurality of battery modules in which a plurality of plate-shaped batteries are stacked and fixed in a case. However, as a period of use increases, a thickness of an electrode inside the battery increases due to repeated charging and discharging, and as a result, the battery may expand and become thicker. When the battery expands, it may become impossible to ensure electrical insulation between the battery and the case. Therefore, insulation is monitored by using a technique for monitoring insulation of a battery module (JP 2002-264582 A).

SUMMARY OF INVENTION

In the battery module, a plate surface portion of the battery and an inner surface of the case are in contact with each other, and are designed to ensure high insulation in advance. Therefore, even if the battery expands in a stacking direction, the insulation between the battery and the case is easily maintained. On the other hand, in many cases, the battery and the case are designed to be separated from each other at a side plane portion of the battery, so the insulation due to the contact may not be sufficiently ensured.

Here, in the case, a planar portion that contacts the plate surface portion of the battery, and a side plane portion that faces the side plane portion of the battery are connected via one side. In such a case, when an outward stress in the stacking direction of the battery acts near a center of the planar portion due to the expansion of the battery, on one side forming a boundary between the planar portion and the side plane portion, a stress is generated at both end portions that curve inward in the stacking direction. As a result, a central portion of the side plane portion may curve toward an inside of the battery module and come into contact with the battery, resulting in deterioration of the insulation.

An object of the present invention is to reduce a possibility that a side plane portion of a battery comes into contact with a case when the battery expands and becomes thicker in a battery module.

A battery module according to one embodiment of the present invention includes a plate-shaped battery; and a case that accommodates the battery therein. The case includes a planar portion sandwiching a plate surface portion of the battery, and a side plane portion facing a side surface of the battery and connected to the planar portion via a first side. The side plane portion of the case has a curve restriction structure extending from a second side facing the first side toward the first side.

DESCRIPTION OF EMBODIMENTS

Figure 1A:
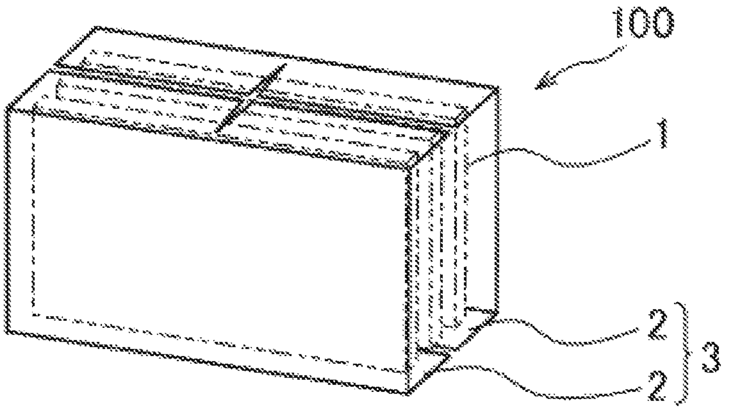
FIG. 1A is a perspective view of a battery module according to a first embodiment.

Hereinafter, embodiments of the present invention will be described with reference to the drawings and the like. Although directions in the drawings will be used in the following description, the directions do not limit directions in which constituent members such as battery modules are arranged, and each member can be disposed in any direction.

First Embodiment

Figure 1B:
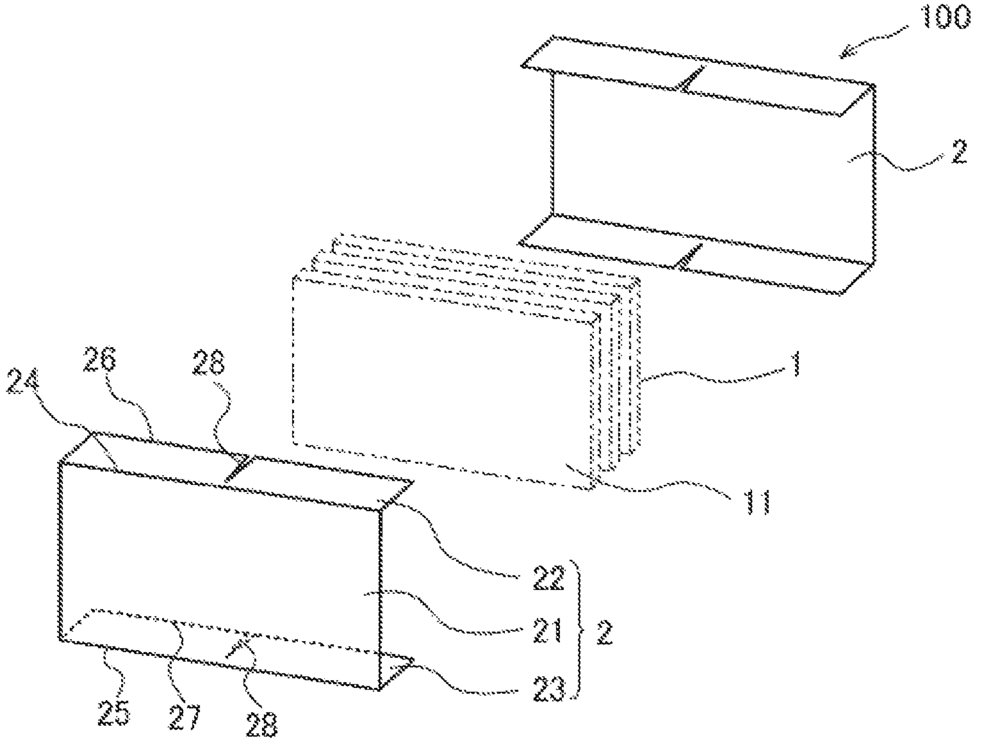
FIG. 1B is an exploded perspective view of the battery module.
Figure 1C:
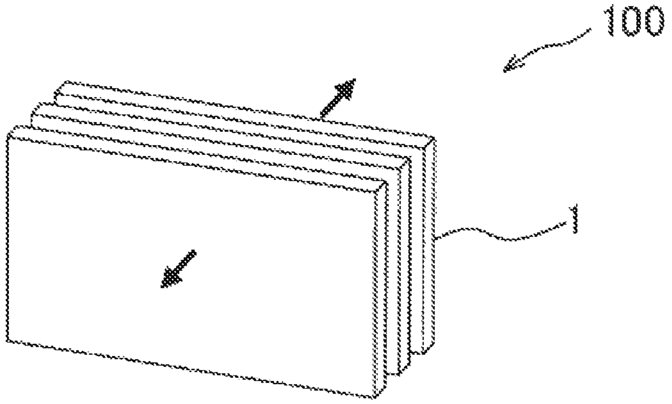
FIG. 1C is a perspective view of a battery inside the battery module.

FIG. 1A is a perspective view of a battery module according to a first embodiment of the present invention. FIG. 1B is an exploded perspective view of the battery module shown in FIG. 1A. FIG. 1C is a perspective view of a battery inside the battery module.

As shown in the drawings, in a battery module 100, in the present embodiment, three plate-shaped batteries 1 are stacked and fixed inside a housing 3 formed by two cover members 2. The two cover members 2 are connected and fixed by a connecting member (not shown), and the battery 1 is press-fitted into the housing 3 in the stacking direction. The battery module 100 may be disposed, for example, in a battery accommodating chamber of the vehicle, or may be mounted outside the vehicle.

The battery 1 is a rechargeable and dischargeable battery formed in a rectangular plate shape. In the following description, the battery 1, which is the plate-shaped member, includes plate surface portions facing each other in the stacking direction and four side plane portions provided perpendicular to the plate surface portions. Among the side plane portions of the battery 1, a side plane portion on an upper side in the figure is referred to as an upper side plane portion, and a side plane portion on a lower side in the figure is referred to as a lower side plane portion. Further, among the plate surface portions of the battery 1 provided in end portions in the stacking direction, a surface facing and in contact with the cover member 2 on an outer side in the stacking direction is referred to as a stacking end surface 11.

The battery 1 is fixed in the housing 3 in a state in which the plate surface portions of the battery 1 are sandwiched by the planar portions 21 of the pair of cover members 2. The plate surface portion of the battery 1 and the planar portion 21 of the cover member 2 are electrically insulated from each other. Further, side surfaces of the battery 1 are separated from an upper side plane portion 22 and a lower side plane portion 23 of the cover member 2.

The battery 1 is, for example, a lithium ion battery, and includes an electrolyte therein. When a thickness of an electrode inside the battery increases due to repeated charging and discharging due to aged deterioration, the battery 1 may expand and increase in thickness. As shown in FIG. 1C, each battery 1 expands in a manner of becoming thicker around a center (an arrow portion in FIG. 1C) of a stacking surface of the battery 1.

Referring again to FIG. 1B, the cover member 2 constituting the housing 3 includes the planar portion 21 in contact with the stacking end surface 11 of the battery 1, and the upper side plane portion 22 and the lower side plane portion 23 which are connected to the planar portion 21 in an upper-lower direction of FIG. 1B. The planar portion 21 is formed in a rectangular shape of which a length in a width direction is larger than that in a height direction. Further, the planar portion 21 and the upper side plane portion 22 are connected via an upper side 24, and the planar portion 21 and the lower side plane portion 23 are connected via a lower side 25. The upper side 24 and the lower side 25 are examples of a first side.

A notch 28 extending in the stacking direction is provided near a center of each of a long side 26 that faces and is positioned substantially parallel to the upper side 24 in the upper side plane portion 22 and a long side 27 that faces and is positioned substantially parallel to the lower side 25 in the lower side plane portion 23. The notches 28 are formed in a tapered shape such that widths thereof respectively decrease from the long sides 26 and 27 toward an inside (the upper side 24 and the lower side 25) in the upper side plane portion 22 and the lower side plane portion 23. The long sides 26 and 27 are examples of a second side.

A pair of cover members 2 constitute the housing 3. The pair of cover members 2 are disposed such that the upper side plane portions 22 and the lower side plane portions 23 extend inward with respect to the planar portions 21 in a state in which the planar portions 21 face each other. In this manner, the housing 3 in which the battery 1 is accommodated is configured in a region defined by the planar portions 21, the upper side plane portions 22, and the lower side plane portions 23.

Figure 2A:
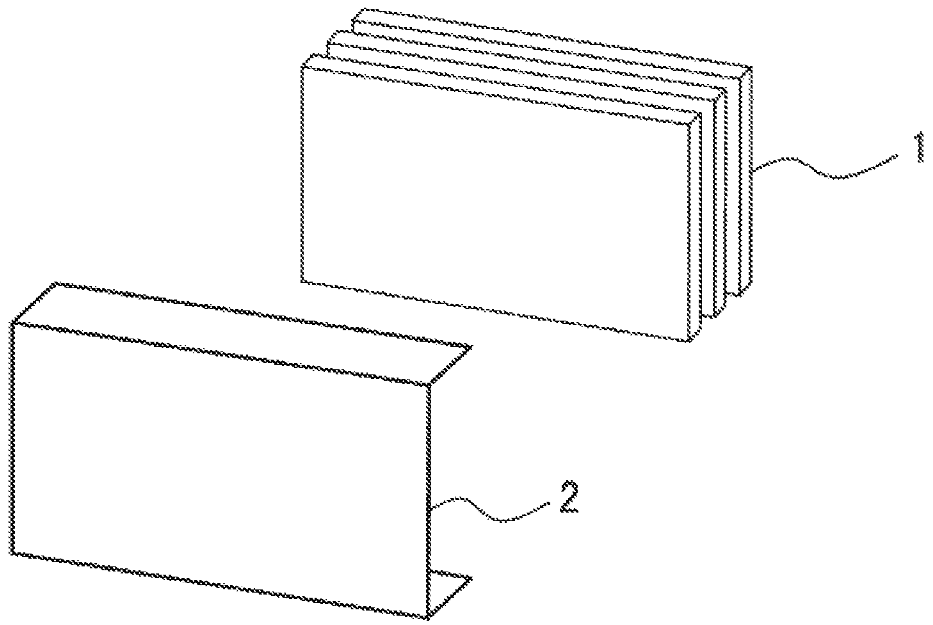
FIG. 2A is a part of an exploded perspective view of a battery module according to a comparative example before expansion.
Figure 2B:
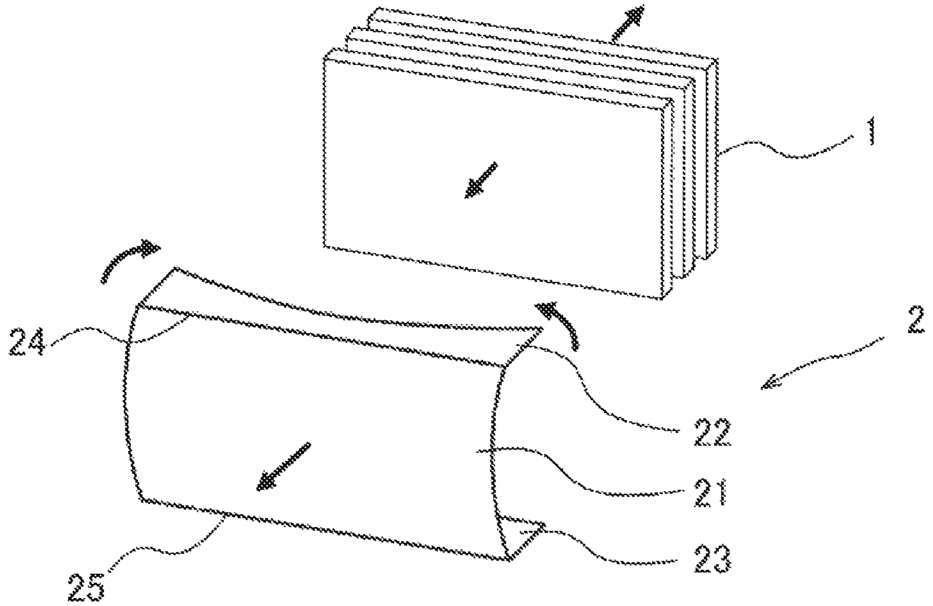
FIG. 2B is a part of an exploded perspective view of the battery module after the expansion.

Here, distortion of the cover member 2 caused by the expansion of the battery 1 in the thickness direction will be described with reference to FIGS. 2A and 2B. Each of FIGS. 2A and 2B is a part of an exploded perspective view of the battery module 100 of a comparative example, in which the battery 1 and one cover member 2 provided on a left front side of the battery 1 in the figure are shown, and the other cover member 2 on a right rear side in the figure is not shown. In the comparative example, the notch 28 is not provided in the cover member 2. FIG. 2A shows a state of the battery 1 before expansion, and FIG. 2B shows a state of the battery 1 after the expansion.

As shown in FIG. 2B, in a case in which the notch 28 is not provided, when the battery 1 expands due to aged deterioration and becomes thicker, the planar portion 21 of the cover member 2 is pushed out by the battery 1 from an inside and curved. In the cover member 2, when a central portion of the planar portion 21 is pushed outward in a stacking direction, an outward stress also acts on central portions of the upper side 24 and the lower side 25.

Here, the planar portion 21 and the upper side plane portion 22 are connected via the upper side 24, and the planar portion 21 and the lower side plane portion 23 are connected via the lower side 25. Therefore, due to the stress acting outward in the stacking direction at the central portions of the upper side 24 and the lower side 25, an inward stress is generated at both end portions of the upper side plane portion 22 and the lower side plane portion 23 in a longitudinal direction so as to approach each other as indicated by arrows.

As described above, in the upper side plane portion 22 and the lower side plane portion 23, the outward stress acting on the central portions of the upper side 24 and the lower side 25 and the inward stress acting on the both end portions thereof act. As a result, the central portions of the upper side plane portion 22 and the lower side plane portion 23 are curved in a manner of sagging toward an inside of the battery module 100 according to these stresses. In this way, the upper side plane portion 22 and the lower side plane portion 23 tilt toward the inside.

Figure 3A:
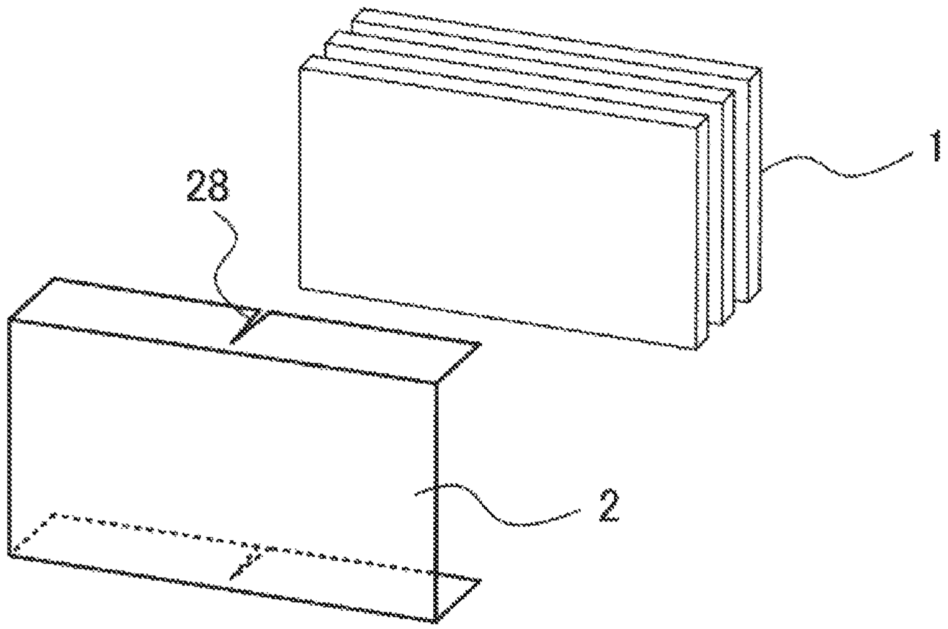
FIG. 3A is a part of an exploded perspective view of the battery module according to the first embodiment before the battery is expanded.
Figure 3B:
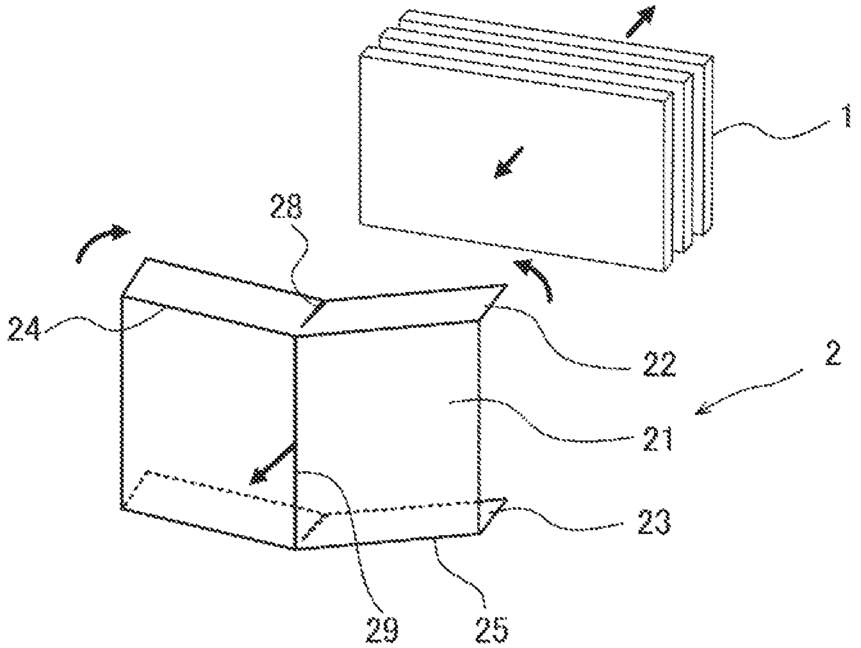
FIG. 3B is a part of an exploded perspective view of the battery module after the battery is expanded.

In contrast, FIGS. 3A and 3B are exploded perspective views of the battery module 100 according to the present embodiment. These figures also show the battery 1 and one cover member 2 provided on the left front side of the battery 1 in the figures, and the other cover member 2 on the right rear side in the figures is omitted. FIG. 3A shows a state of the battery 1 before the expansion, and FIG. 3B shows a state of the battery 1 after the expansion. As shown in these figures, the cover member 2 is provided with the notch 28.

In FIG. 3B, a stress line 29 extending in a transverse direction is shown in a central portion of the planar portion 21 in the longitudinal direction. The stress line 29 indicates a portion of the planar portion 21 on which a stress acting outward due to the expansion of the battery 1 is likely to act. The notches 28 provided in the upper side plane portion 22 and the lower side plane portion 23 are provided in a manner of extending in the same plane as the stress lines 29.

As shown in FIG. 3B, when the battery 1 expands due to the aged deterioration and becomes thicker, the central portion of the planar portion 21 of the cover member 2 is pushed outward, and a stress concentrated on the stress line 29 and acting outward is generated.

In this case, at the upper side 24 and the lower side 25, the stress concentrates on points intersecting the stress line 29. Due to the stress acting outward on the upper side 24 and the lower side 25, the stress acts inward on both end portions of the upper side plane portion 22 and the lower side plane portion 23 as indicated by arrows.

In the upper side plane portion 22 and the lower side plane portion 23 according to the present embodiment, since the notches 28 are provided, even when the stress acts inward on the both end portions as indicated by the arrows, the upper side plane portion 22 and the lower side plane portion 23 are deformed such that the widths of the notches 28 decrease. As a result, as compared with the case in which the notch 28 as shown in FIG. 2B is not provided, the upper side plane portion 22 and the lower side plane portion 23 are prevented from respectively sagging in opposite directions (inwardly of the cover member 2).

Figure 4A:
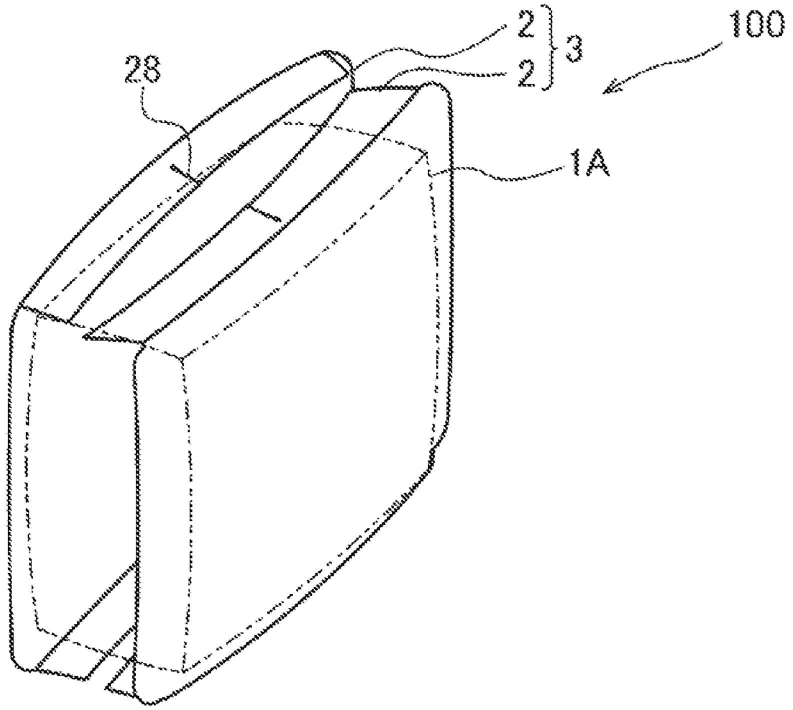
FIG. 4A is an exploded perspective view of the battery module as viewed from another direction.
Figure 4B:
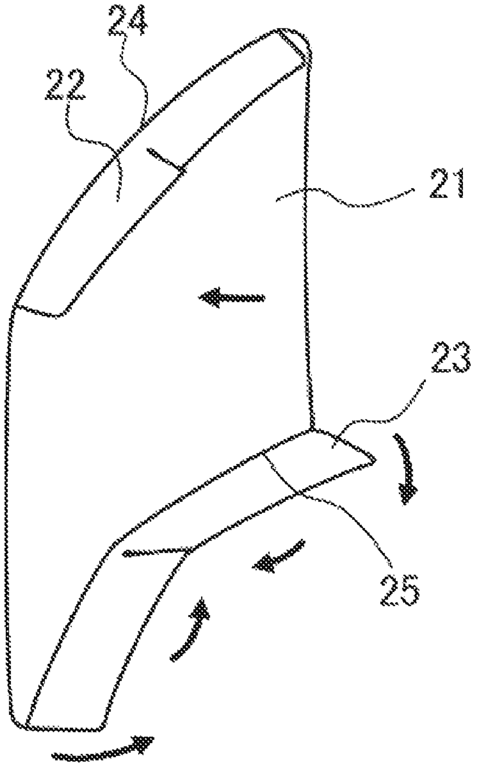
FIG. 4B is a part of an exploded perspective view of the battery module.
Figure 4C:
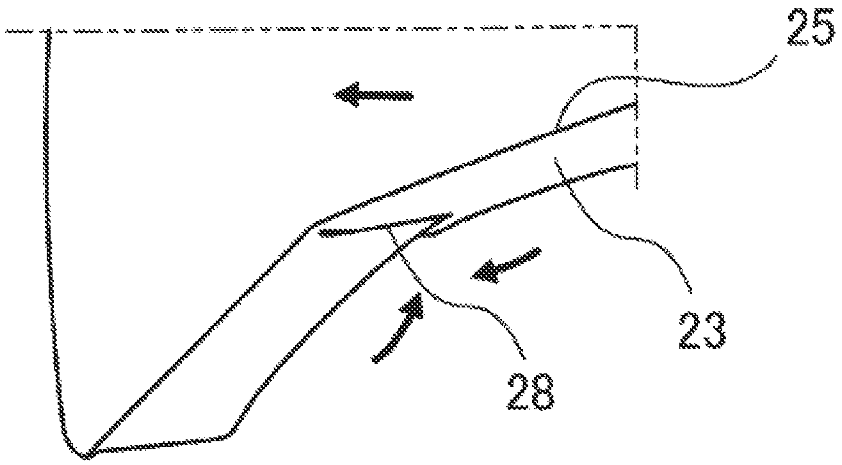
FIG. 4C is an enlarged view of a part in FIG. 4B.

FIGS. 4A to 4C are perspective views of the battery module 100 when the battery 1 expands, as viewed from another direction. FIG. 4A is an overall perspective view of the battery module 100. FIG. 4B is a perspective view of one side of the cover member 2 viewed from the inside. FIG. 4C is an enlarged view of the lower side plane portion 23 of the cover member 2. In FIG. 4A, a state in which a plurality of batteries 1 are stacked is collectively shown as a battery stack 1A.

As shown in FIG. 4B, when the battery stack 1A expands in the thickness direction, the outward stress mainly acts on the central portion of the planar portion 21 of the cover member 2 of the housing 3, and the upper side 24 and the lower side 25 are curved due to the action of the outward stress at the central portion. Due to this curve, the inward stress acts on the both end portions of the upper side plane portion 22 and the lower side plane portion 23 as indicated by the arrows.

As shown in FIG. 4C, the notches 28 are provided in the side plane portions 22 and 23. Therefore, even if the inward stress acts on the side plane portions 22 and 23, the side plane portions 22 and 23 change such that groove widths of the notches 28 decrease, and opposing inner surfaces come closer to each other. In the figure, the groove width of each of the notches 28 is eliminated, and the notch 28 is deformed to such an extent that the opposing inner side surfaces thereof overlap with each other. As a result, it is possible to prevent the side plane portions 22 and 23 from respectively sagging (curving) in the opposite directions (inwardly of the cover member 2), and to reduce a possibility that the cover member 2 comes into contact with the side surface of the battery 1.

The contact between the cover member 2 and the side surface of the battery 1 can be detected by using a technique of monitoring the insulation of the battery module 100. By providing the notch 28 as in the present embodiment, the cover member 2 is prevented from coming into contact with the battery 1, so that a time until it is detected that there is a problem in insulation becomes long, and an inspection cycle of the battery module 100 can be lengthened. On the other hand, by shortening the notch 28, an amount of preventing of the side plane portions 22 and 23 from sagging (curving) inwardly of the cover member 2 in the opposite directions is reduced, so that the time until it is detected that there is the problem in insulation is shortened, and the inspection cycle of the battery 1 can be shortened to promote a periodic inspection. In this way, a size and a shape of the notch 28 may be changed according to a target inspection period of the battery 1 (target time until it is detected that there is the problem in insulation).

In the present embodiment, an example has been described in which the plurality of batteries 1 are stacked and provided inside the housing 3. The laminated battery stack 1A may be formed by folding and winding the plate-shaped batteries 1 and accommodated in the housing 3. In the laminated battery stack 1A, when the battery stack 1A expands due to the aged deterioration, a thickness perpendicular to a portion (plate surface portion) having a large area increases. Therefore, by providing the notches 28 in the side plane portions 22 and 23 each connected to the planar portions 21 facing a surface corresponding to the stacking end surface 11 having a large area, inward curving of the side plane portions 22 and 23 due to the expansion of the battery 1 can be prevented.

According to the first embodiment, the following effects can be obtained.

The battery module 100 according to the first embodiment includes the plate-shaped batteries 1, and the cover members 2 (housing 3) that accommodate the battery 1 therein. The cover member 2 includes the planar portion 21 that sandwiches the stacking end surface 11 (plate surface portion) of the battery 1, and the side plane portions 22 and 23 that respectively face the side surfaces of the battery 1 in a state of being separated from the side surfaces and are connected to the planar portion 21 via the upper side 24 and the lower side 25 (first sides), respectively. Further, the side plane portions 22 and 23 of the cover member 2 have, in the long sides 26 and 27 (second sides) facing the upper side 24 and the lower side 25 (first sides) connected to the planar portion 21, the notches 28 which are curve restriction structures extending toward the upper side 24 and the lower side 25 (first sides), respectively.

When the battery 1 expands due to the aged deterioration and becomes thicker, the central portion of the planar portion 21 of the cover member 2 is pushed outward. Therefore, the stress concentrates near the centers of the upper side 24 and the lower side 25 to curve the upper side 24 and the lower side 25 outward. Due to this curve, in the upper side plane portion 22 and the lower side plane portion 23, the stress acts inward at the both end portions in the longitudinal direction, and the side plane portions 22 and 23 are further tilted toward the opposite directions, respectively.

since the upper side plane portion 22 and the lower side plane portion 23 according to the present embodiment are provided with the notches 28, the upper side plane portion 22 and the lower side plane portion 23 are deformed such that the widths of the notches 28 decrease, even when the outward stress acts on the central portions of the upper side 24 and the lower side 25 and the inward stress acts on the both end portions. As a result, the sagging (curving) inwardly of the cover member 2 is prevented in the vicinity of the centers of the upper side plane portion 22 and the lower side plane portion 23, and the possibility that the cover member 2 comes into contact with the battery 1 can be reduced.

Even if the notches 28 are respectively provided in the upper side plane portion 22 and the lower side plane portion 23, it is not possible to completely prevent the upper side plane portion 22 and the lower side plane portion 23 from sagging inwardly of the cover member 2, and deflection due to the sagging occurs in each of two longitudinally opposed portions via the notch 28. However, a maximum value of an inward sag amount (deflection amount) of the deflection is smaller than a deflection amount when the notch 28 is not provided in each of the upper side plane portion 22 and the lower side plane portion 23 and the deflection occurs at one place. As described above, the provision of the notch 28 reduces the deflection amount, thereby preventing contact of the cover member 2 with the battery 1.

According to the battery module 100 of the first embodiment, the notches 28 which are the curve restriction structures are formed in the tapered shape in which the widths respectively decrease from the long sides 26 and 27 toward the inside (the upper side 24 and the lower side 25). That is, in the upper side plane portion 22 and the lower side plane portion 23, the notches 28 are configured such that the groove widths become wider in the long sides 26 and 27 which are farthest from the upper side 24 and the lower side 25 which are in contact with the planar portion 21 on which the stress due to the expanding battery 1 acts.

Here, the sag (curve) of the upper side plane portion 22 and the lower side plane portion 23 in the opposite directions increases as distances from the upper side 24 and the lower side 25 connected to the planar portion 21 increases. Here, the notches 28 are formed to be wider at the long sides 26 and 27 where distances from the planar portion 21 are the farthest. Accordingly, since the notches 28 that restrict the curve are formed to be wide at portions where the upper side plane portion 22 and the lower side plane portion 23 may greatly sag inwardly of the cover member 2, it is possible to reduce the deflection amount caused by the sagging of the upper side plane portion 22 and the lower side plane portion 23 toward the inside.

According to the battery module 100 of the first embodiment, one notch 28 is provided near the center of each of the long side 26 of the upper side plane portion 22 and the long side 27 of the lower side plane portion 23. Here, in the cover member 2, when the central portion of the planar portion 21 is pushed outward and the stress is concentrated near the centers of the upper side 24 and the lower side 25 to curve the upper side 24 and the lower side 25 outward, the inward stress acts on the both end portions of the upper side plane portion 22 and the lower side plane portion 23.

As described above, when the outward stress concentrates near the centers of the upper side 24 and the lower side 25 and the inward stress acts on the both end portions, the sagging inwardly of the cover member 2 occurs near the centers of the upper side plane portion 22 and the lower side plane portion 23. Therefore, since one notch 28 is provided in each of the upper side plane portion 22 and the lower side plane portion 23 near the centers of the long sides 26 and 27 on which the stress is likely to act, it is possible to prevent this sag (curve).

Second Embodiment

In the first embodiment, the example in which one battery module 100 is disposed has been described, but the present invention is not limited thereto. In the second embodiment, an example in which a plurality of battery modules 100 are stacked in a stacking direction of the batteries 1 will be described.

Figure 5:
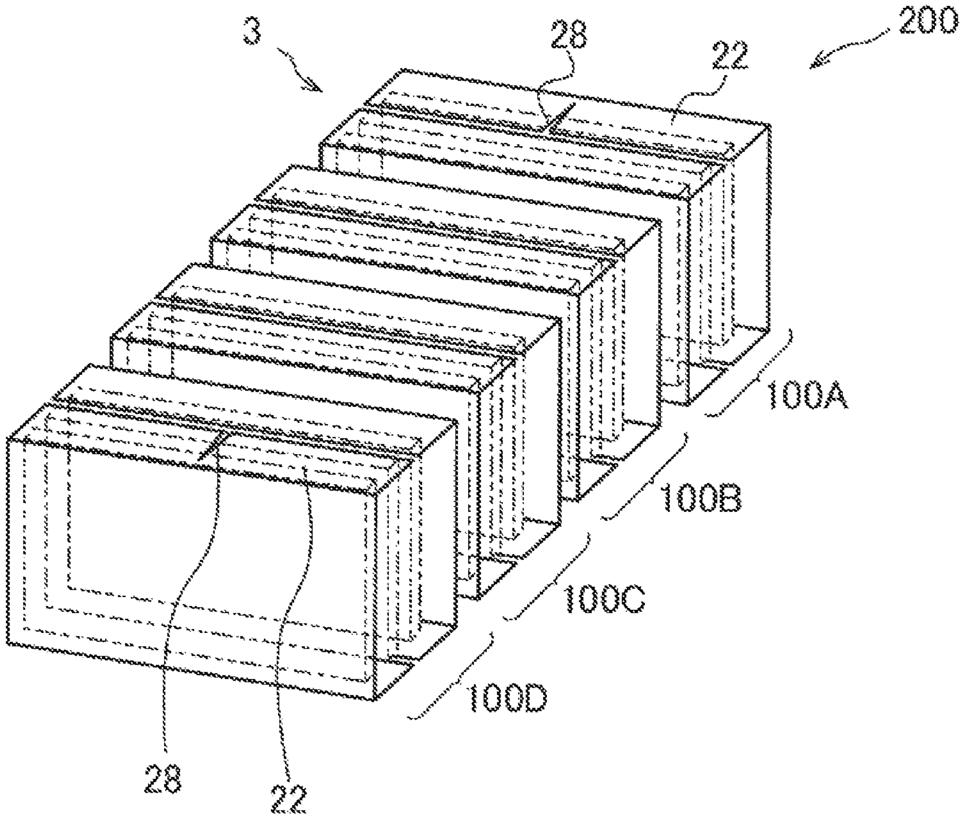
FIG. 5 is a perspective view of a battery system according to a second embodiment.

FIG. 5 is a perspective view showing a battery system 200 according to the second embodiment. In the present embodiment, a plurality of the battery modules 100 (four battery modules 100A to 100D in the present embodiment) of the first embodiment are arranged side by side in the stacking direction of the batteries 1, thereby constituting the battery system 200.

In the housings 3 of the battery modules 100A and 100D located on outermost sides in an arrangement direction in the battery system 200, the notches 28 are provided in the upper side plane portions 22 and the lower side plane portions 23 of the cover members 2 located on outer sides in the arrangement direction (the notches 28 of the lower side plane portions 23 are not shown).

Since an increase amount in the thickness direction of the battery modules 100A to 100D is accumulated in the arrangement direction, a deformation amount of the cover members in the thickness direction increases in the battery modules 100A and 100D in the arrangement direction. Therefore, by respectively providing the notches 28 in the upper side plane portion 22 and the lower side plane portion 23 of the cover member 2 in each of the outer battery modules 100A, 100D, the upper side plane portion 22 and the lower side plane portion 23 which are affected by the cover member 2 having a large deformation amount in the thickness direction are prevented from sagging inward.

According to the second embodiment, the following effects can be obtained.

According to the battery system 200 of the second embodiment, in the battery modules 100A, 100D located on the outermost side in the stacking direction, the notches 28 are provided in the side plane portions 22, 23 of the cover member 2 located on the outer side.

Here, the curving in the arrangement direction of the planar portion 21 of the cover member 2 due to the expansion of the batteries 1 in the battery modules 100A to 100D causes a large deformation amount in the cover member 2 at each of the battery modules 100A and 100D located on the outermost sides in the arrangement direction. Therefore, in each of the battery modules 100A and 100D located on the outermost sides, the notches 28 are provided in the upper side plane portion 22 and the lower side plane portion 23 of the outer cover member 2, so that the upper side plane portion 22 and the lower side plane portion 23 of the cover member 2 having the large deformation amount are prevented from sagging inwardly of the cover member 2. As a result, it is possible to prevent the upper side plane portion 22 and the lower side plane portion 23 from respectively sagging (curving) in the opposite directions while reducing the number of places where the notch 28 is provided.

Third Embodiment

In a third embodiment, a configuration example of another notch 28 in the battery system 200 similar to that of the second embodiment will be described.

Figure 6:
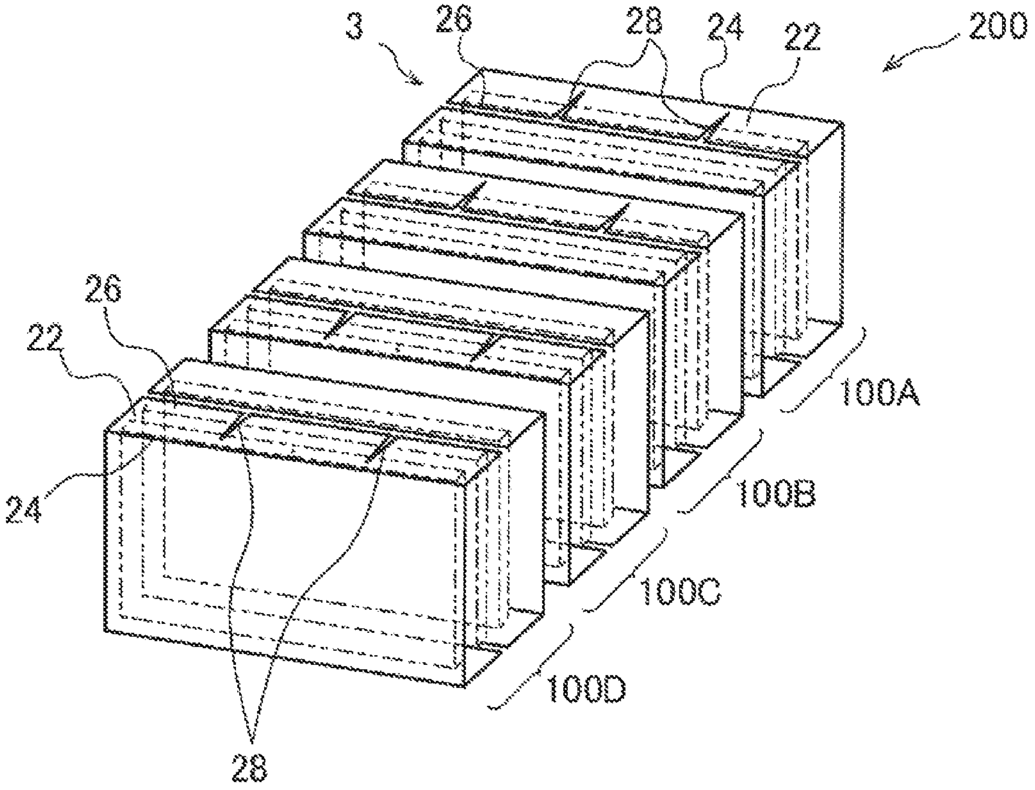
FIG. 6 is a perspective view of a battery system according to a third embodiment.

FIG. 6 is a perspective view of the battery system 200 according to the third embodiment. In the battery system 200, in each of the battery modules 100A to 100D arranged side by side, the notches 28 are provided in the cover member 2 on a side close to an outer side in an arrangement direction, of the two cover members 2 constituting the housing 3. That is, in the battery modules 100A, 100B, the notches 28 are provided in each of the cover members 2 positioned on a right rear side in the figure, and in the battery modules 100C, 100D, the notches 28 are provided in each of the cover member 2 positioned on a left front side in the figure.

Further, two notches 28 are provided in each of the upper side plane portion 22 and the lower side plane portion 23 of the cover member 2. The two notches 28 are provided symmetrically with respect to a center line in a longitudinal direction of the upper side plane portion 22 and the lower side plane portion 23. Even if the notches 28 are configured in this way, the sagging (curving) inwardly of the cover member 2 is prevented near centers of the upper side plane portion 22 and the lower side plane portion 23, and as a result, it is possible to reduce a possibility that the cover member 2 comes into contact with the battery 1.

According to the third embodiment, the following effects can be obtained.

According to the battery system 200 of the third embodiment, in each of the battery modules 100A to 100D, the notches 28 are provided in the side plane portion 22 of the cover member 2 at a position close to the outer side. That is, in the battery modules 100A, 100B, the notches 28 are provided in each of the cover members 2 positioned on the right rear side in the figure, and in the battery modules 100C, 100D, the notches 28 are provided in each of the cover members 2 positioned on the left front side in the figure.

Here, due to curve of the cover member 2 caused by expansion of the battery modules 100A to 100D, a deformation amount in a thickness direction of the cover member 2 positioned further outside in the arrangement direction is increased. Here, in each of the battery modules 100A to 100D, the notches 28 are provided in each of the upper side plane portion 22 and the lower side plane portion 23 of the cover member 2 located at a position close to the outer side.

Accordingly, deformation of the upper side plane portion 22 and the lower side plane portion 23 of the cover member 2 having a large deformation amount in opposite directions is prevented, and thus the cover member 2 can be prevented from coming into contact with the battery 1.

According to the battery system 200 of the third embodiment, a plurality of (two) notches 28 are provided in pairs in each of the long sides 26 and 27 in a manner of being symmetrical with respect to the center line in the longitudinal direction. As described above, even if the notches 28 are provided in the side plane portions 22 and 23, it is not possible to completely prevent the side plane portions 22 and 23 from sagging inwardly of the cover member 2. In the side plane portions 22 and 23 according to the present embodiment, deflection due to the sag occurs in three portions facing one another in the longitudinal direction via the two notches 28. However, since the side plane portions 22 and 23 are provided with a plurality of deflection portions, an maximum value of a sag amount (deflection amount) in a depth direction (inner side) of the deflection is smaller than a sag amount (deflection amount) in the case in which each of the upper side plane portion 22 and the lower side plane portion 23 is not provided with the notch 28 and the deflection occurs at one place or in the case in which one notch 28 is provided and the deflection occurs at two places. As a result, the cover member 2 is prevented from coming into contact with the battery 1.

Fourth Embodiment

In a fourth embodiment, another configuration example of the notch 28 of the battery module 100 will be described.

Figure 7:
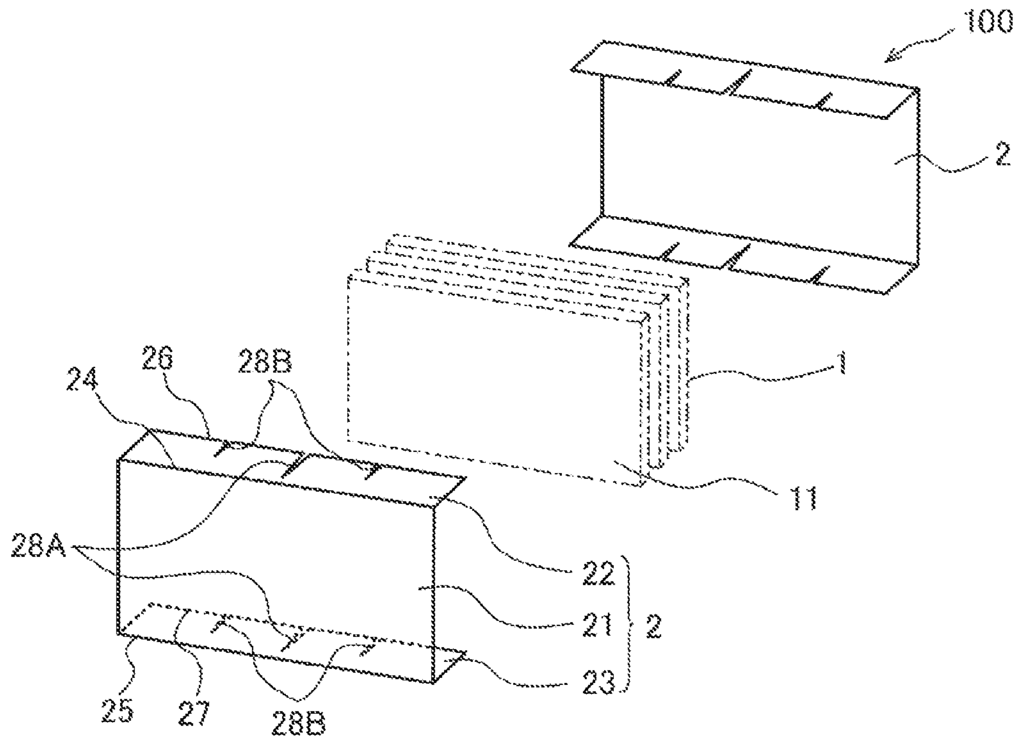
FIG. 7 is an exploded perspective view of a battery module according to a fourth embodiment.

FIG. 7 is a perspective view of the battery module 100 according to the fourth embodiment. According to the figure, each of the long sides 26 and 27 of the upper side plane portion 22 and the lower side plane portion 23 is provided with a first notch 28A provided near a center thereof and two second notches 28B provided symmetrically in the longitudinal direction with respect to the first notch 28A. Moreover, each of the first notch 28A and the second notches 28B is provided in a tapered shape, and a depth in a transverse direction of the first notch 28A is longer than that of the second notch 28B. Even if the notches 28 are configured in this way, the sagging (curving) inwardly of the cover member 2 is prevented near centers of the upper side plane portion 22 and the lower side plane portion 23, and as a result, it is possible to reduce a possibility that the cover member 2 comes into contact with the battery 1.

According to the fourth embodiment, the following effects can be obtained.

In the battery module 100 according to the fourth embodiment, a deflection amount of the entire upper side plane portion 22 and lower side plane portion 23 can be reduced by providing the plurality of notches 28. Further, the depth in the transverse direction of the first notch 28A provided at a central portion in the longitudinal direction is longer than that of the second notch 28B provided beside the first notch 28A. In this way, the first notch 28A provided in a portion of each of the upper side plane portion 22 and the lower side plane portion 23 on which stress caused by expansion of the battery 1 is likely to act is longer, so that it is possible to reduce a sag in each of the upper side plane portion 22 and the lower side plane portion 23.

Fifth Embodiment

In the first to fourth embodiments, although the battery module 100 has been described as an example in which the cover members 2 are formed in the same shape and face each other, the cover member 2 is not limited thereto. In a fourth embodiment, the example in which the cover members 2 are formed in different shapes and combined in a manner of being fitted each other will be described.

Figure 8A:
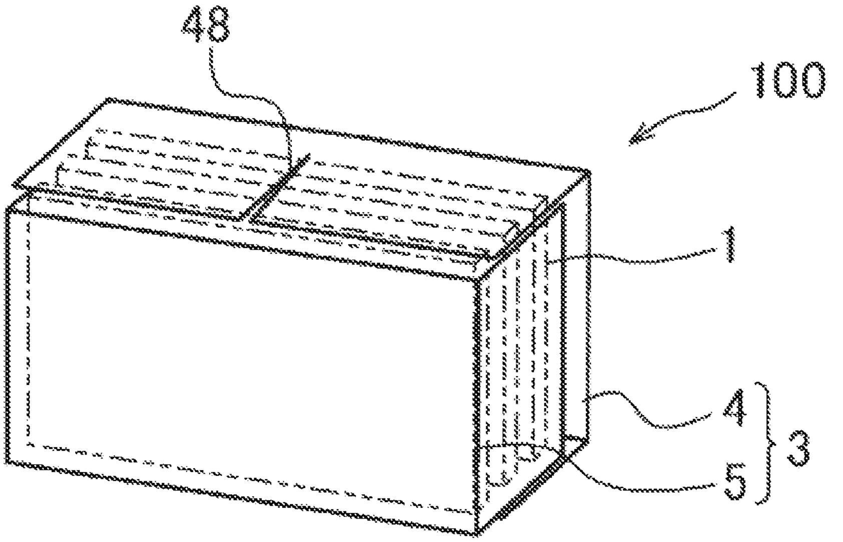
FIG. 8A is a perspective view of a battery module according to a fifth embodiment.
Figure 8B:
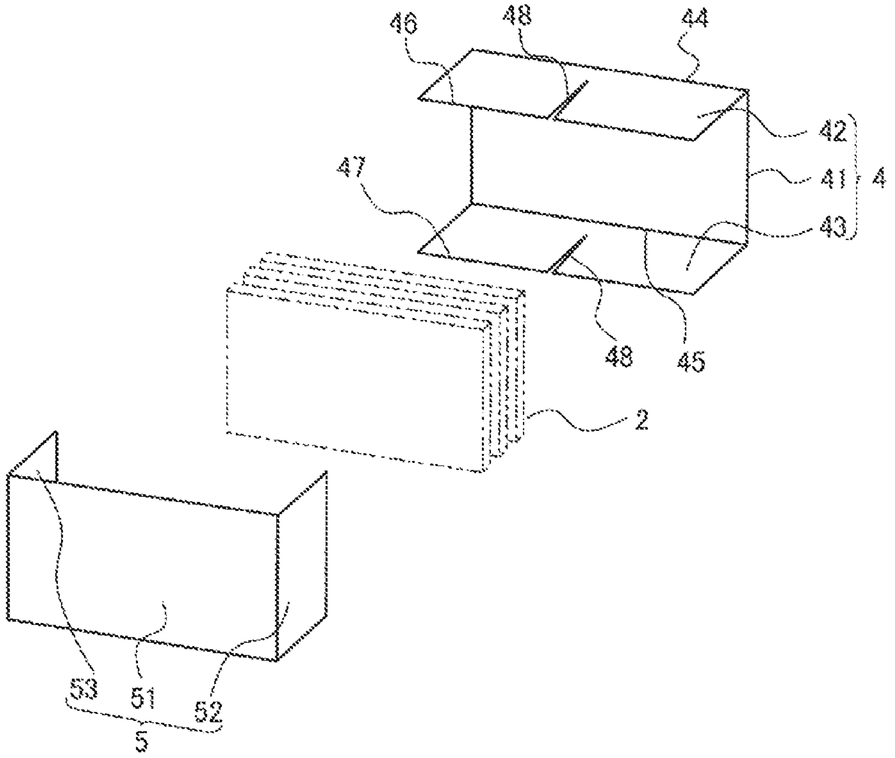
FIG. 8B is an exploded perspective view of the battery module.

FIG. 8A is a perspective view of a battery module according to the fourth embodiment. FIG. 8B is an exploded perspective view of the battery module shown in FIG. 8A. As shown in FIG. 8A, the housing 3 according to the fifth embodiment is formed by cover members 4 and 5, which are connected by welding.

The cover member 4 includes a flat surface 41, and an upper side plane portion 42 and a lower side plane portion 43 connected to the flat surface 41 at an upper side 44 and a lower side 45. In the upper side plane portion 42 and the lower side plane portion 43, a notch 48 is provided near a center in a longitudinal direction in each of long sides 46 and 47 respectively facing the upper side 44 and the lower side 45.

The cover member 5 includes a flat surface 51, and a right side plane portion 52 and a left side plane portion 53 respectively connected to a right side and a left side of the flat surface 51. No notch is provided in the right side plane portion 52 and the left side plane portion 53 of the cover member 5.

The cover member 4 and the cover member 5 are disposed such that the flat surface 41 and the flat surface 51 face each other, and the upper side plane portion 42, the lower side plane portion 43, the right side plane portion 52, and the left side plane portion 53 are fitted to one another. In this way, the cover member 4 and the cover member 5 constitute the housing 3.

Even with such a configuration, when the battery 1 expands due to aged deterioration and becomes thicker, in the cover member 4, a central portion of the flat surface 41 is pushed outward and the vicinity of a center is pressed from an inside and curved.

Outward stress is concentrated near centers in the longitudinal direction of the upper side 44 and the lower side 45 of the flat surface 41 to curve the upper side 44 and the lower side 45. Due to this curve, stress acts inward on both end portions of the upper side plane portion 42 and the lower side plane portion 43 in the longitudinal direction. Since the notches 48 are respectively provided in the upper side plane portion 42 and the lower side plane portion 43, the upper side plane portion 42 and the lower side plane portion 43 are deformed such that widths of the notches 48 decrease even when the stress acts inward on the both end portions. As a result, the upper side plane portion 42 and the lower side plane portion 43 are prevented from sagging (curving) inwardly of the cover member 4.

According to the fifth embodiment, the following effects can be obtained.

The battery module 100 according to the fifth embodiment includes plate-shaped batteries 1 and the cover member 4 (housing 3) that accommodates the batteries 1 therein. The cover member 4 includes the flat surface 41 facing the stacking end surface 11 (plate surface portion) of the battery 1, and the side plane portions 42 and 43 facing side surfaces of the battery 1 and connected to the flat surface 41. Further, the side plane portions 42 and 43 of the cover member 4 have the notches 48, which are curve restriction structures, at the long sides 46 and 47 respectively facing the upper side 44 and the lower side 45 connected to the flat surface 41.

When the battery 1 expands due to the aged deterioration and becomes thicker, if the central portion of the flat surface 41 of the cover member 4 is pushed outward, the stress acts inward on both side portions of the upper side plane portion 42 and the lower side plane portion 43 in the longitudinal direction.

Since the notches 48 are respectively provided in the upper side plane portion 42 and the lower side plane portion 43 according to the present embodiment, each of the upper side plane portion 42 and the lower side plane portion 43 is deformed such that opposing inner side surfaces of the notch 48 approach each other and the width of the notch 48 decreases even when the stress acts inward on the both sides. As a result, the sagging inwardly of the cover member 4 is prevented in the vicinity of the centers of the upper side plane portion 42 and the lower side plane portion 43, and a possibility that the cover member 4 comes into contact with the battery 1 can be reduced.

Sixth Embodiment

In the first to fifth embodiments, the example in which the cover members 2 and 4 are prevented from sagging inward when the battery 1 accommodated therein is expanded by providing the notches 28 and 48 as the curve restriction structure in the cover members 2 and 4 constituting the battery module 100 has been described. In the sixth embodiment, an example in which a curve restriction structure having a shape different from those of the notches 28 and 48 is provided will be described. In the present embodiment, the cover members 2 having the same shape as that of the cover members 2 according to the first embodiment face each other to form the housing 3.

Figure 9A:
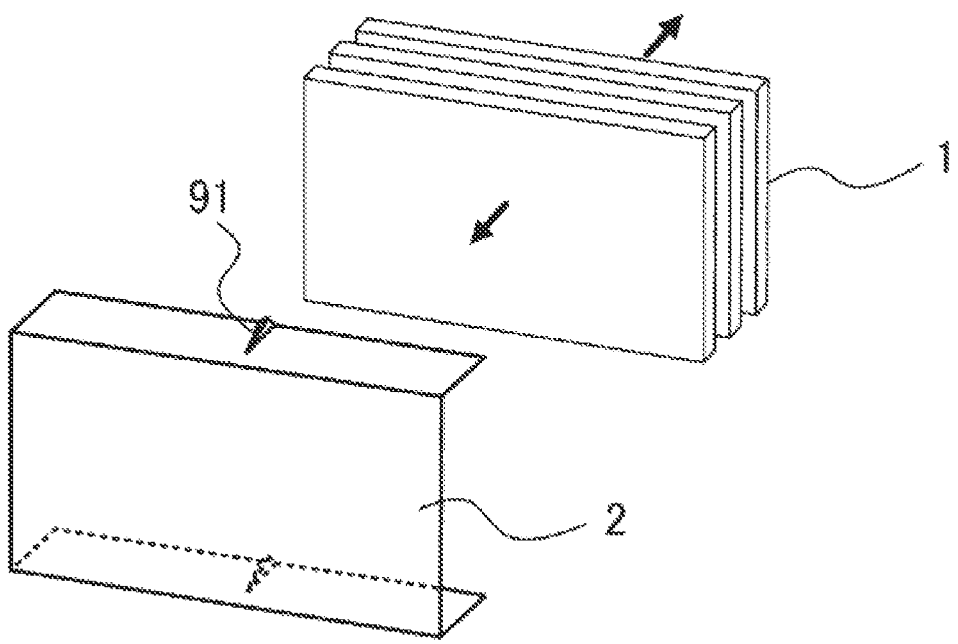
FIG. 9A is a part of an exploded perspective view of a battery module according to a sixth embodiment before a battery is expanded.
Figure 9B:
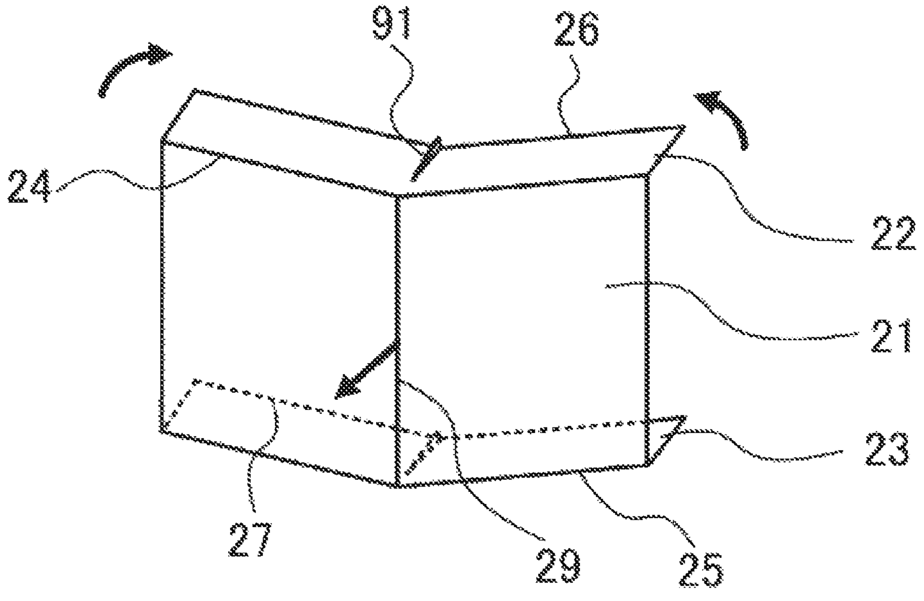
FIG. 9B is a part of an exploded perspective view of the battery module after the battery is expanded.

FIGS. 9A and 9B are exploded perspective views of the battery module 100 when the battery 1 is expanded in the present embodiment. FIG. 9A is a perspective view of one of the cover members 2 as viewed from an inside. FIG. 9B is an enlarged view of a lower side plane portion of the cover member 2.

As shown in these figures, each of the side plane portions 22 and 23 is provided with a protruding portion 91 instead of the notch 28. The protruding portions 91 are provided in a manner of respectively extending toward the upper side 24 and the lower side 25 near centers of the long sides 26 and 27. Specifically, the protruding portions 91 respectively protrude from the side plane portions 22 and 23 in tapered regions of the side plane portions 22 and 23 in which widths respectively decrease from the long sides 26 and 27 toward the inside (the upper side 24 and the lower side 25). The protruding portions 91 may be play (slack) protruding with respect to the side plane portions 22 and 23, and may be folded.

When the battery 1 expands due to aged deterioration and becomes thicker, in the cover member 2, a central portion of the planar portion 21 is pushed outward, stress is concentrated on the stress line 29, and the vicinity of a center of the planar portion 21 of the cover member 2 is pressed from the inside and curved. In this case, the stress is concentrated at points of the upper side 24 and the lower side 25 of the planar portion 21 intersecting the stress line 29 to curve the upper side 24 and the lower side 25. Due to this curve, stress acts inward on both end portions of the upper side plane portion 22 and the lower side plane portion 23 in a longitudinal direction as indicated by arrows.

Since the protruding portions 91 are respectively provided in the upper side plane portion 22 and the lower side plane portion 23 according to the present embodiment, the protruding portions 91 are deformed so as to further respectively protrude in directions opposite to sides facing the upper side plane portion 22 and the lower side plane portion 23 when the stress acts inward at the both end portions as indicated by the arrows. As a result, the upper side plane portion 22 and the lower side plane portion 23 are prevented from sagging inwardly of the cover member 2 along the stress line 29.

According to the sixth embodiment, the following effects can be obtained.

In the battery module 100 according to the sixth embodiment, since the protruding portions 91 are respectively provided on the side plane portions 22 and 23, even if the stress acts inward on the both side portions, the side plane portions 22 and 23 are deformed such that both end portions of each of the protruding portions 91 approach each other and a width decreases, and the protruding portions 91 are deformed so as to further protrude with respect to the side plane portions 22 and 23. As a result, the sagging inwardly of the cover member 2 does not occur near the centers of the upper side plane portion 22 and the lower side plane portion 23, and a possibility that the cover member 2 comes into contact with the battery 1 can be reduced.

In the first to fourth embodiments, the side plane portions 22 and 23 are respectively provided with the tapered notches 28 of which the widths decrease from the long sides 26 and 27 toward the upper side 24 and the lower side 25, in the fifth embodiment, the side plane portions 42 and 43 are respectively provided with the tapered notches 48 of which the widths decrease from the long sides 46 and 47 toward the upper side 44 and the lower side 45, and in the sixth embodiment, the side plane portions 22 and 23 are respectively provided with the protruding portions 81 of which the widths decrease from the long sides 26 and 27 toward the upper side 24 and the lower side 25, but the present invention is not limited thereto. Even if each of the notches 28, 48 and the protruding portions 81 is provided with the same width, it is possible to prevent the side plane portions 22, 23, 42, 43, 52, and 53 from sagging (curving) inward.

In the first to fourth and sixth embodiments, the example in which the cover member 2 is not provided with side plane portions in the left-right direction in the figures, but is provided with the upper side plane portion 22 and the lower side plane portion 23 has been described, but the invention is not limited thereto. The side plane portions may be provided in the cover member 2 in the left-right direction in the figure. In such a case, a curve restriction member such as a notch or a protruding portion may be provided in each of the left and right side plane portions in these figures, and by providing the curve restriction member, it is possible to prevent the side plane portions from sagging (curving) inward due to the expansion of the battery 1. In the fifth embodiment, although no notch is provided in the right side plane portion 52 and the left side plane portion 53 of the cover member 5, the side plane portions 52 and 53 can be prevented from sagging inward (curving) by providing the notch.

Although the embodiments of the present invention have been described above, the above embodiments are merely a part of application examples of the present invention and are not intended to limit the technical scope of the present invention to the specific configurations of the above embodiments. Each of the embodiments described above has been described as a single embodiment, but may be appropriately combined.

The invention claimed is:

1. A battery module comprising:

a battery that is plate-shaped; and a case that accommodates the battery therein, wherein the case includes a planar portion sandwiching a plate surface portion of the battery, and a side plane portion facing a side surface of the battery and connected to the planar portion via a first side, the side plane portion of the case has a curve restriction structure extending from a second side facing the first side toward the first side, and the curve restriction structure is a notch provided from the second side toward the first side of the side plane portion.

2. The battery module according to claim 1, wherein the notch is configured such that a width thereof decreases from the second side toward the first side.

3. A battery module comprising:

a battery that is plate-shaped; and a case that accommodates the battery therein, wherein the case includes a planar portion sandwiching a plate surface portion of the battery, and a side plane portion facing a side surface of the battery and connected to the planar portion via a first side, the side plane portion of the case has a curve restriction structure extending from a second side facing the first side toward the first side, the curve restriction structure is a protruding portion protruding from the side plane portion, and the protruding portion is formed in a tapered shape such that a width thereof decreases from the second side toward the first side.

4. The battery module according to claim 1, wherein one curve restriction structure is provided near a center of the second side in the side plane portion.

5. The battery module according to claim 1, wherein curve restriction structures are provided in pair substantially symmetrically about a central portion of the second side in the side plane portion.

6. The battery module according to claim 2, wherein the notch includes one first notch provided near a center of the second side in the side plane portion, and second notches provided in pair substantially symmetrically with respect to the first notch, and the first notch is longer than each of the second notches in a direction from the second side toward the first side.

7. A battery system comprising:

a plurality of battery modules according to claim 1 which are stacked, wherein in the battery module, the side plane portion of the case located at a position close to an outer side has the curve restriction structure.

8. The battery system according to claim 7, wherein in the battery module located on an outermost side of the battery system in a stacking direction, the side plane portion of the case located at the position close to the outer side has the curve restriction structure.

* * * * *